(12) United States Patent
Ruiz-Velasco

(10) Patent No.: US 8,452,822 B2
(45) Date of Patent: May 28, 2013

(54) UNIVERSAL FILE NAMING FOR PERSONAL MEDIA OVER CONTENT DELIVERY NETWORKS

(75) Inventor: Enrique Ruiz-Velasco, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 268 days.

(21) Appl. No.: 12/827,396

(22) Filed: Jun. 30, 2010

(65) Prior Publication Data

US 2012/0005245 A1    Jan. 5, 2012

(51) Int. Cl.
*G06F 17/30* (2006.01)

(52) U.S. Cl.
USPC .......................................... 707/822; 707/756

(58) Field of Classification Search
USPC .................. 707/692, 687, 679, 705, 769, 803
See application file for complete search history.

(56) References Cited

U.S. PATENT DOCUMENTS

| | | | | |
|---|---|---|---|---|
| 6,249,782 B1* | 6/2001 | Day et al. | | 1/1 |
| 7,400,785 B2* | 7/2008 | Haas et al. | | 382/312 |
| 7,447,649 B2* | 11/2008 | Jain et al. | | 705/27.2 |
| 7,539,698 B2* | 5/2009 | Sakaniwa et al. | | 1/1 |
| 7,836,024 B2* | 11/2010 | Yoshida | | 707/674 |
| 8,103,636 B2* | 1/2012 | Lee et al. | | 707/679 |
| 2002/0078069 A1* | 6/2002 | Moore | | 707/200 |
| 2003/0074394 A1* | 4/2003 | Eshghi | | 709/203 |
| 2003/0233352 A1* | 12/2003 | Baker | | 707/3 |
| 2005/0222994 A1* | 10/2005 | Douceur et al. | | 707/3 |
| 2005/0283623 A1* | 12/2005 | Vanderheyden et al. | | 713/193 |
| 2006/0004820 A1* | 1/2006 | Claudatos et al. | | 707/101 |
| 2008/0294667 A1* | 11/2008 | Kopf | | 707/101 |
| 2008/0295114 A1* | 11/2008 | Argade et al. | | 719/320 |
| 2010/0094813 A1* | 4/2010 | Brueggemann et al. | | 707/692 |
| 2010/0138366 A1* | 6/2010 | Zhang | | 706/12 |
| 2010/0211556 A1* | 8/2010 | Ueda et al. | | 707/705 |
| 2011/0071987 A1* | 3/2011 | Davis et al. | | 707/687 |
| 2011/0246514 A1* | 10/2011 | Bartholomew | | 707/769 |

* cited by examiner

*Primary Examiner* — Debbie Le

(57) ABSTRACT

A device receives, from a content provider device, a personal media file with a custom name and generates a universal file name for the file based on a digital fingerprint extracted from the file. The device associates the universal file name with the custom name and determines that the universal file name is associated with a previously-stored file, where the previously-stored file and the file with the custom name have an identical digital fingerprint. The device discards the file with the custom name, and associates the custom name with the universal file name for later retrieval.

18 Claims, 9 Drawing Sheets

120 →

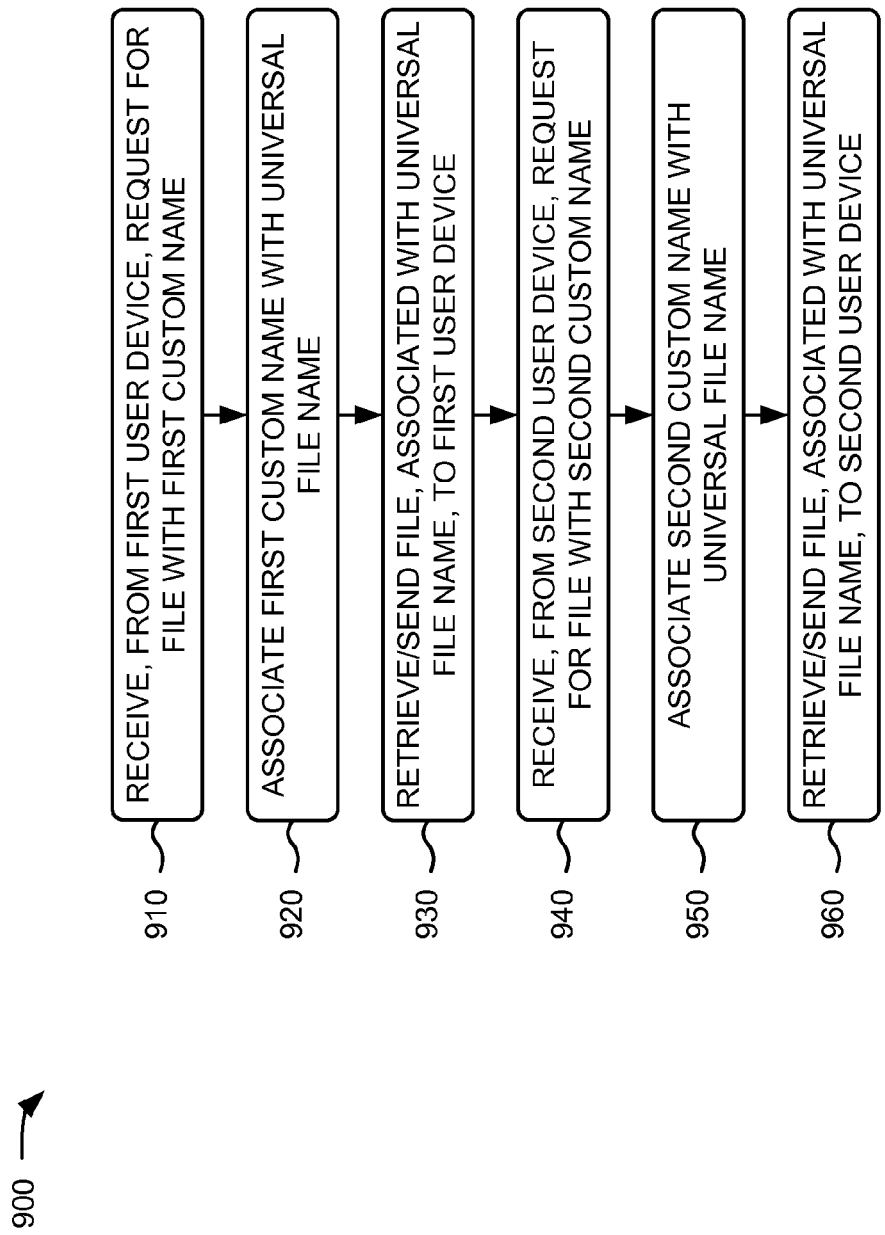

UNIVERSAL FILE NAMING FOR PERSONAL MEDIA OVER CONTENT DELIVERY NETWORKS

BACKGROUND

A content delivery network (CDN) is generally a distributed system of components containing copies of data files, including personal media files, placed at various points in a network so as to maximize bandwidth for access to the data files from clients throughout the network. To avoid congestion at a central server, a user can access a copy of the data from an edge server near to the user, as opposed to all users accessing the same central server. CDNs typically rely on file names of content to cache data and propagate the data to the edge servers. However, identical copies of personal media are sometimes uploaded to the CDN with different file names. Thus, servers within the CDNs may store multiple copies of identical files.

BRIEF DESCRIPTION OF THE DRAWINGS

FIG. 9 is a flow chart of example process for retrieving content with universal file names according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may include systems and/or methods that may provide uniform file names for personal media files received from different sources within a CDN. A network server may receive, from a content provider device, a personal media file with a custom name and may generate a universal file name for the file based on a digital fingerprint extracted from the file. The digital fingerprint may be obtained using one or more types of mechanisms, depending on the type and size of the personal media file. The network server may associate the universal file name with the custom name and may determine that the universal file name is associated with a previously-stored file. The previously-stored file and the file with the custom name may have an identical universal file name due to an identical digital fingerprint. The network server may discard the file with the custom name and may associate the custom name with the universal file name for later retrieval. Storage of duplicate files within the CDN may thus be reduced.

As used herein, the terms "user," "customer," and "subscriber," are intended to be broadly interpreted to include a user device and/or a user application or a user of a user device and/or a user application. A user application may include any operating system software and/or application software that make use of features and may be executed by a user device.

The term "content," as used herein, is intended to be broadly interpreted to include, for example, data (e.g., multimedia content files, such as music, videos, games, pictures, e-books, etc.) and/or applications (e.g., a multimedia player, a music player, a video player, an image viewer, etc.). The content may be presented, for example, in a menu, a list, an icon, a window, etc.

Figure 1:
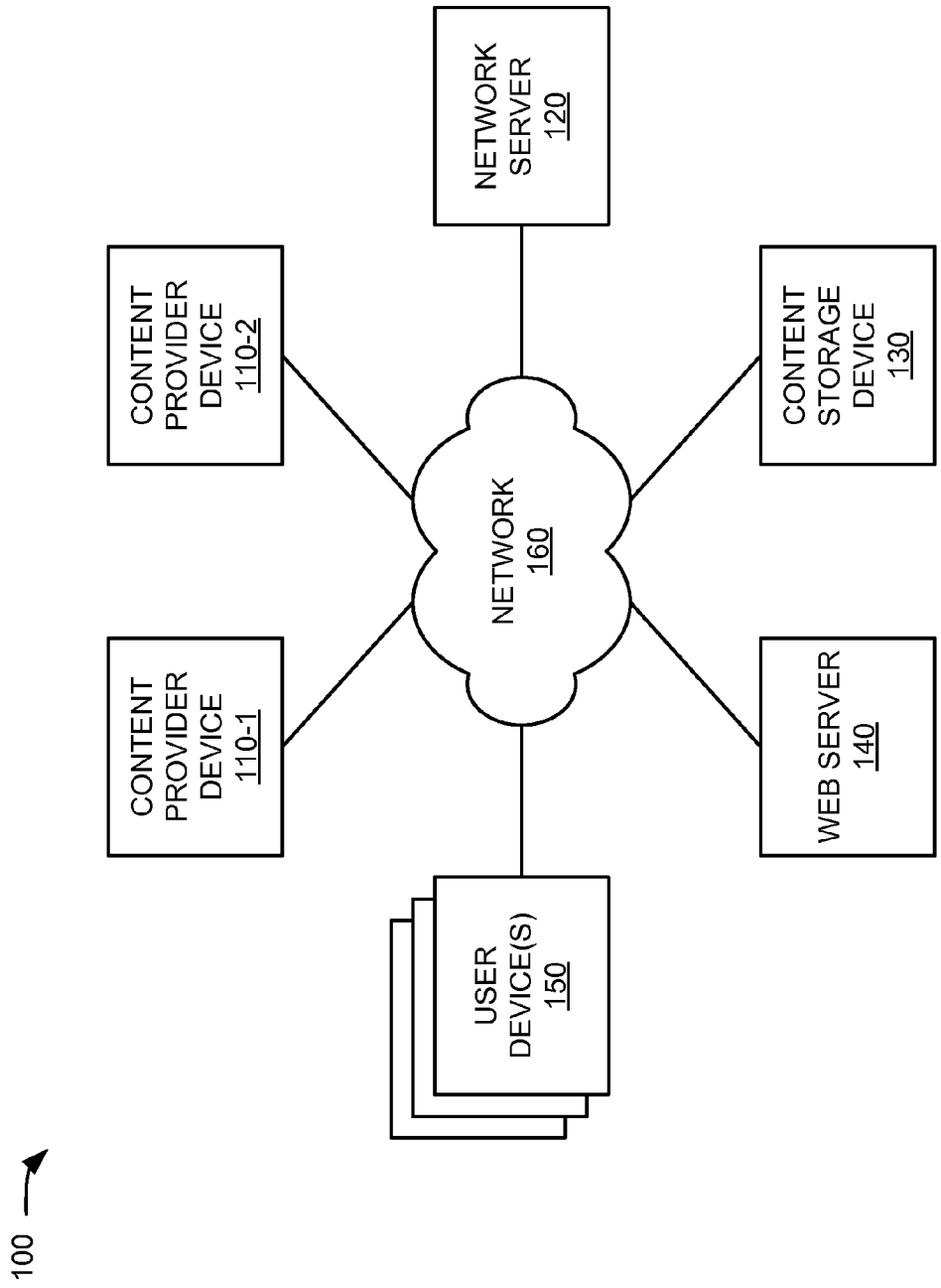
FIG. 1 is a diagram of an example network in which systems and/or methods described herein may be implemented.

FIG. 1 depicts a diagram of an example network 100 in which systems and/or methods described herein may be implemented. As illustrated, network 100 may include content provider devices 110-1 and 110-2 (referred to collectively as "content provider devices 110" or singularly as "content provider device 110"), a network server 120, a content storage device 130, a web server 140, and one or more user devices 150 (referred to singularly as "user device 110") interconnected by a network 160. Components of network 100 may interconnect via wired and/or wireless connections. Two content provider devices 110; multiple user devices 150; and a single network server 120, content storage device 130, web server 140, and network 160 have been illustrated in FIG. 1 for simplicity. In practice, there may be more content provider devices 110, network servers 120, content storage devices 130, web servers 140, user devices 150, and/or networks 160. Also, in some instances, one or more of the components of network 100 may perform one or more functions described as being performed by another one or more of the components of network 100.

Content provider device 110 may include one or more computing devices, or other types of computation or communication devices, that gather, process, search, and/or provide information in a manner described herein. In an example implementation, content provider device 110 may include, for example, a desktop computer, a laptop computer, a personal digital assistant (PDA), etc., used for general computing tasks. In other implementations, content provider device 110 may include a server device. Content provider device 110 may also be used by users to access accounts with Internet service providers (ISPs) to send (e.g., upload) content to network server 120 over network 160. In one implementation, content provider device 110 may also act as a user device 150.

Network server 120 may include one or more server devices, or other types of computation or communication devices, that gather, process, search, and/or provide information in a manner described herein. In an example implementation, network server 120 may communicate with content provider device 110 and may receive (e.g., from content provider device 110) uploaded content, such as personal media files. In one implementation, network server 110 may extract a digital fingerprint for an uploaded file and generate a universal file name for the uploaded file based on the digital fingerprint. Network server 120 may incorporate various transport and/or sharing protocols, such as BitTorrent™, FastTrack™, Direct Connect, peer-to-peer television (P2PTV), Peer Distributed Transfer Protocol (PDTP), etc. to receive and format uploaded content. Network server 120 may also include decryption capabilities to decrypt encrypted content provided, for example, from content provider device 110.

Content storage device 130 may include one or more devices that receive and maintain content uploaded from content provider devices 110. Content storage device 130 may include, for example, a database, server, or another device with a memory component. Content storage device 130 may store, for example, multimedia content and/or links to multimedia content that may be accessed by another device, such as web server 140. In one implementation, content storage device 130 may be a distributed component.

Web server 140 may include one or more server devices, or other types of computation or communication devices, that gather, process, search, store, and/or provide information in a manner similar to that described herein. Web server 140 may interface with network server 120, content storage device 130, and/or user devices 150 via network 160. Web server 140 may host Internet-based websites, such as content sharing websites (e.g., YouTube®, blip®, Veoh®, flikr®, etc.), social networking websites (e.g., Twitter®, Facebook®, Myspace®, etc.), blog websites, search engine websites (e.g., Google®, Yahoo®, etc.), message board websites, etc. In one implementation, web server 140 may receive a request, from a user device 150, for a particular file (e.g., a personal media file) that has a custom name and, in response, provide the file associated with a corresponding universal file name.

User device 150 may include one or more computing devices, or other types of computation or communication devices, that gather, process, search, and/or provide information in a manner described herein. In an example implementation, user device 150 may include a radiotelephone, a personal communications system (PCS) terminal (e.g., that may combine a cellular radiotelephone with data processing and data communications capabilities), a wireless telephone, a cellular telephone, a smart phone, a PDA (e.g., that can include a radiotelephone, a pager, Internet/intranet access, etc.), a laptop computer (e.g., with a broadband air card), a personal computer, a landline telephone, or other types of computation or communication devices. In an example implementation, user device 150 may include a device that is capable of accessing services (e.g., content-related services) provided by the other components of network 100. In one implementation, user device 150 may also act as a content provider device 110.

Network 160 may include a single network or multiple networks. For example, network 160 may include a content delivery network, such as a fiber optic network, to distribute multimedia content from content storage device 130 to user devices 150. Additionally, or alternatively, network 160 may take the form of a wide area network (WAN), a local area network (LAN), an intranet, or a telephone network (e.g., the Public Switched Telephone Network (PSTN) or a cellular network). In one implementation, network 160 may include a peer to peer (P2P)-based network that supports services provided by peers, such as content provider device 110 and user device 150. In another example, network 160 may include a broadband and/or global network, such as the Internet.

Although FIG. 1 shows example components (e.g., devices) of network 100, in other implementations, network 100 may contain fewer components, different components, differently arranged components, or additional components than depicted in FIG. 1.

Figure 2:
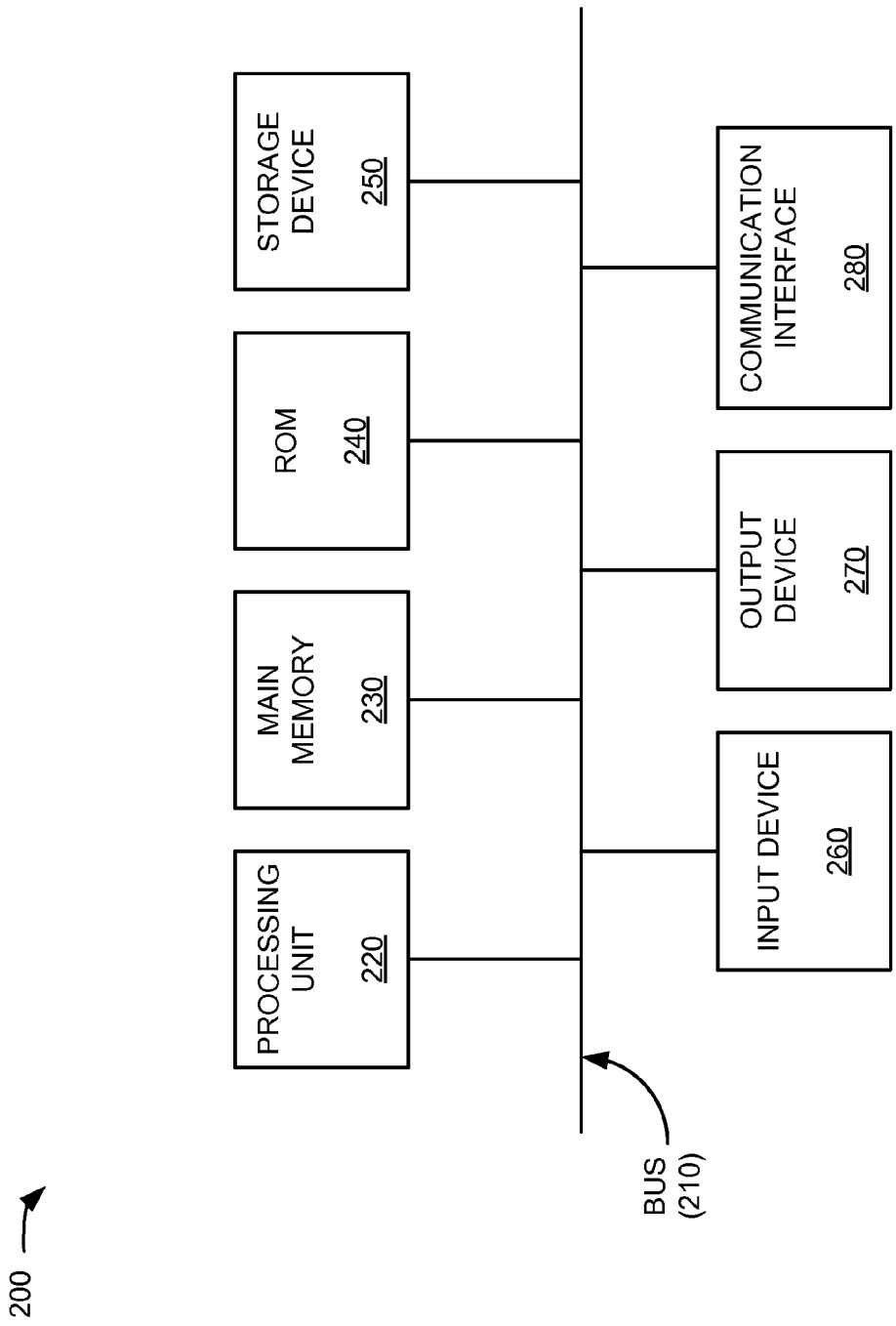
FIG. 2 is a diagram of example components of a device that may correspond to one of the devices of the network depicted in FIG. 1.

FIG. 2 is an example diagram of a device 200 that may correspond to one or more of content provider device 110, network server 120, content storage device 130, web server 140, and user device 150. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer, different, differently arranged, or additional components than depicted in FIG. 2. Alternatively, or additionally, one or more components of device 200 may perform one or more other tasks described as being performed by one or more other components of device 200.

Figure 3:
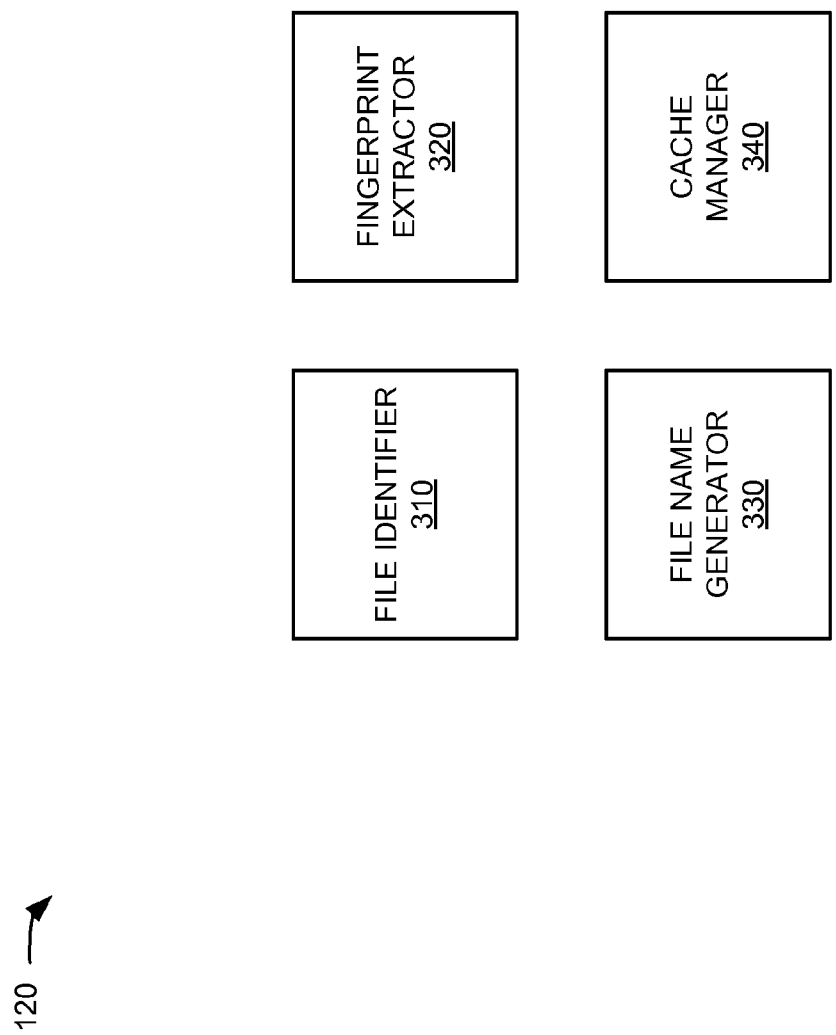
FIG. 3 is a diagram of example functional components of a network server depicted in FIG. 1.

FIG. 3 is a diagram of example functional components of network server 120. As illustrated, network server 120 may include a file identifier 310, a fingerprint extractor 320, a file name generator 330, and a cache manager 340. In one example, the functionality described in connection with FIG. 3 may be performed by one or more of the components of device 200 (FIG. 2).

File identifier 310 may include hardware or a combination of hardware and software to identify a file type and/or file size for a file uploaded from content provider device 110. File identifier 310 may, for example, identify a MIME type (Multipurpose Internet Mail Extension or Multimedia Email Extension, as defined by Request for Comments (RFC) 1521 and RFC 1522) or file extension (e.g., mp3, avi, jpg, zip, doc, etc.) for a particular uploaded file. File identifier 310 may also, for example, identify the file size (e.g., a number or range of bytes) of an uploaded file. Based on the identified file type and/or file size, file identifier 310 may select a particular sample size (e.g., of N bytes from particular various places in file) and/or a mechanism that is appropriate to generate a fingerprint for that file type. For example, a more simplistic fingerprinting mechanism may be used for smaller file sizes or types of files that tend to have smaller file sizes. In contrast, a more complex fingerprinting mechanism may be used for comparatively larger file sizes or types of files that tend to have larger file sizes.

Fingerprint extractor 320 may include hardware or a combination of hardware and software to generate a digital fingerprint for the file uploaded from content provider device 110. Fingerprint extractor 320 may, for example, extract a fingerprint from the uploaded file that is unique to the file content (e.g., regardless of the user name assigned to the file content). In one implementation, the fingerprint may be extensive enough to distinguish files that are very similar. Fingerprint extractor 320 may employ one or more fingerprinting schemes. For example, fingerprint extractor 320 may employ a fingerprinting mechanism, such as Rabin's fingerprinting algorithm, that provides an identifiable probability of collision (e.g., the probability that two strings r and s yielding the same w-bit fingerprint does not exceed $\max(|r|,|s|)/2^{w-1}$, where $|r|$ and $|s|$ represent the length of the strings in bits). In another implementation, fingerprint extractor 320 may employ another fingerprinting mechanism or a cryptographic hash function (e.g., message digest 5 (MD5) or a version of the Secure Hash Algorithm (SHA-1, SHA-2)). In one implementation, fingerprint extractor 320 may identify a fingerprint of a particular file that excludes metadata associated with the file.

In an implementation, fingerprint extractor 320 may interchangeably apply a fingerprinting scheme depending on the size or type of uploaded file identified by file identifier 310. In another implementation, a different sample length (e.g., 64 bits, 128 bits, etc.) may be used within a single fingerprinting scheme depending on the size or type of the uploaded file identified by file identifier 310. Fingerprint extractor 320 may be arranged to prevent unauthorized parties from determining the actual fingerprint extraction process (such as the actual fingerprinting scheme used for a particular uploaded file) so that only actual duplicate content is grouped under the same fingerprint.

File name generator 330 may include hardware or a combination of hardware and software to convert the digital fingerprint, for the file uploaded from content provider device 110, to an alphanumeric sequence. File name generator may also append an appropriate file type extension (e.g., mp3, avi, etc.) to create a universal file name for the particular file. For example, a sixty-four bit sample of binary code (e.g., ones and zeros) may be converted to a file name of letters and numbers (e.g., "8zAf23yq.mp3"). In one implementation, the universal file name may be derived from a base-36 representation of the digital fingerprint. That is, a standard 26-letter western alphabet (e.g., Latin letters "a" through "z") and 10 Arabic numerals (e.g., 0 through 9) may be used to provide 36 options for each character of the universal filename. In another implementation, case sensitive letters may be used in the alphanumeric file name to provide a total of 56 options for each character of the universal filename.

Cache manager 340 may include hardware or a combination of hardware and software to identify an uploaded file as unique or a duplicate, update a content storage directory, and/or manage storage of uploaded files. For example, cache manager 340 may compare the universal file name assigned (e.g., by file name generator 330) to an uploaded file with a file name index to determine if an uploaded file is unique. If a file is not unique (e.g., a stored file is already associated with the universal file name), cache manager 340 may simply associate, in the file name index, the original file name of the uploaded file with the universal file name. If a file is unique (e.g., a stored file is not already associated with the universal file name), cache manager 340 may store the uploaded file and write, to the file name index, the original file name of the uploaded file and the universal file name. The file name index may be replicated, for example, to content storage device 130 and/or web server 140. The file name index is described further in connection with, for example, FIG. 4.

Although FIG. 3 shows example functional components of network server 120, in other implementations, network server 120 may contain fewer functional components, different functional components, differently arranged functional components, or additional functional components than depicted in FIG. 3. Alternatively, or additionally, one or more components of network server 120 may perform one or more other tasks described as being performed by one or more other components of network server 120. Furthermore, in some implementations, one or more functional components of network server 120 may be implemented by another device, such as content provider device 110.

Figure 4:
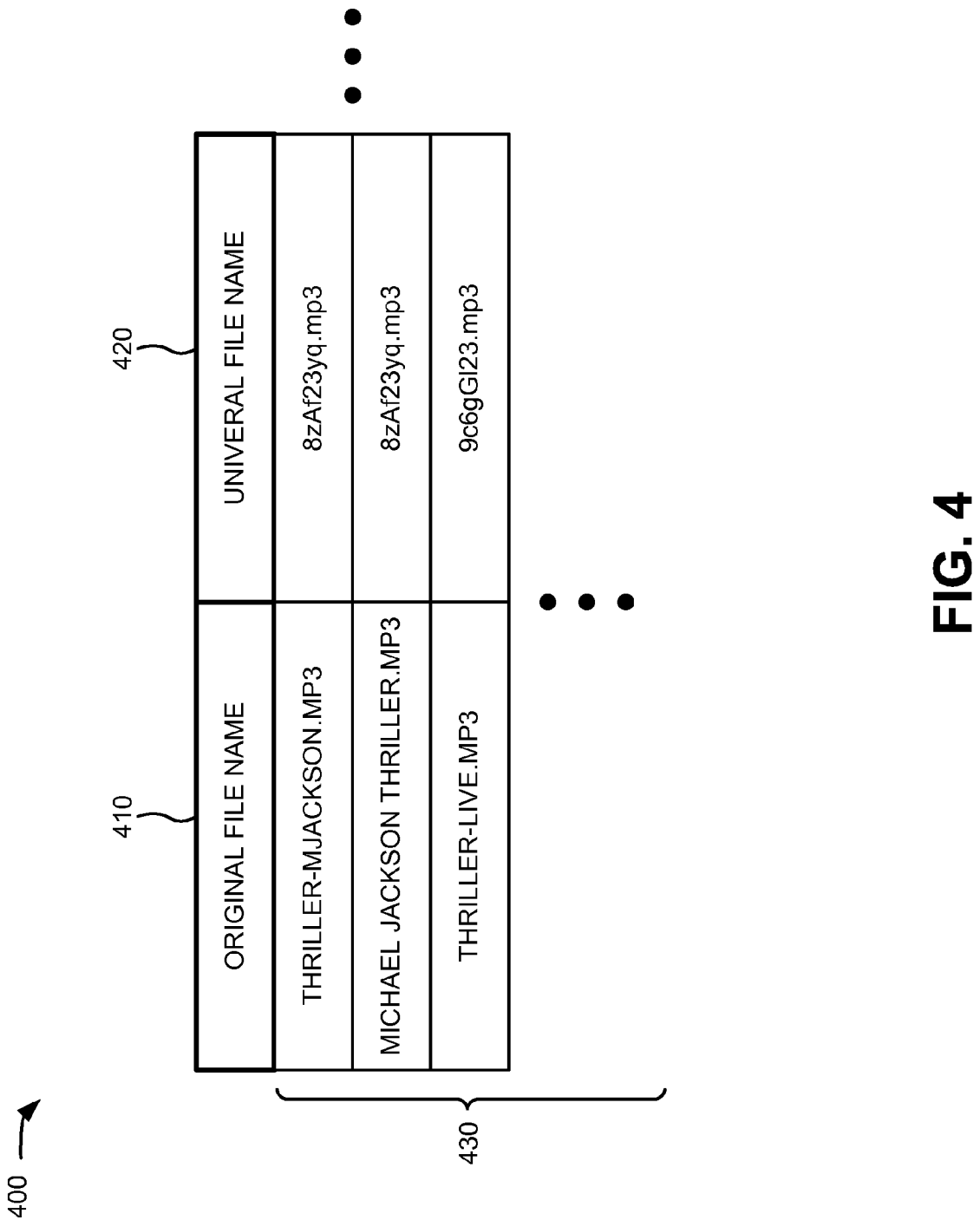
FIG. 4 is a diagram of an example data structure for a file name index that may be used by the cache manager of FIG. 3.

FIG. 4 is a diagram illustrating an example data structure 400 that may be used by cache manager 340 as a file name index. As shown in FIG. 4, data structure 400 may include an original file name column 410, a universal file name column 420, and a variety of entries 430 associated with original file name column 410 and universal file name column 420.

Original file name column 410 may include entries corresponding to file names, associated with an uploaded file, that have been provided by content provider device 110. For example, as shown in FIG. 4, original file name column 410 may include the file name entries 430 (e.g., "Thirller-MJackson.mp3," "Michael Jackson Thriller.mp3," and "Thriller-Live.mp3"). Original file name entries 430 may include, for example, different names for identical files, identical names for different files, and/or different names for different files. In some instances, an original file name (e.g., as received from content provider device 110) may be identical to a later-assigned universal file name.

Universal file name column 420 may include entries corresponding to universal file names, associated with an uploaded file, that have been assigned by network server 120 (e.g., file name generator 330). For example, as shown in FIG. 4, universal file name column 420 may include the file name entries 430 (e.g., "8zAf23yq.mp3," "8zAf23yq.mp3," and "9c6gG123.mp3"). Original file name entries 430 may include, for example, file names based on the digital signature detected for the uploaded file. Content files with the same digital signature (and thus, presumably, the exact same content) may be referenced with identical universal file names regardless of the original file name received from content provider device 110.

Assume in FIG. 4, that files uploaded to network server 120 with the original file names "Thriller-MJackson.mp3" and "Michael Jackson Thriller.mp3" are identical and that the file "Thirller-MJackson.mp3" was uploaded first. Both "Thriller-MJackson.mp3" and "Michael Jackson Thriller.mp3" can be assigned the identical file name (e.g., "8zAf23yq.mp3") by file name generator 330. When the universal file name associated with "Michael Jackson Thriller.mp3" is found in the file name index, cache manager 340 may identify the uploaded file as a duplicate file and create a new entry in the file name index to associate the original file name (e.g., "Michael Jackson Thriller.mp3") with the previously stored universal file name (e.g., "8zAf23yq.mp3").

Assume further in FIG. 4, that another file uploaded to network server 120 with the original file name "Thriller-Live.mp3" is unique to the file name index. The file "Thriller- Live.mp3" can be assigned the file name "9c6gG123.mp3" by file name generator 330 (e.g., based on the digital fingerprint for the file). When the universal file name "Thriller-Live.mp3" is not found in the file name index, cache manager 340 may identify the uploaded file as a unique file and create a new entry in the file name index to associate the original file name (e.g., "Thriller-Live.mp3") with the new universal file name (e.g., "9c6gG123.mp3").

Although FIG. 4 shows example information that may be provided in data structure 400, in other implementations, data structure 400 may contain less information, different information, differently arranged information, or additional information than depicted in FIG. 4. For example, in some implementations, data structure 400 may include other information pertaining to uploaded files, such as a time of creation of each uploaded file, a user name and/or device associated with an uploaded file, a number of downloads of a stored file, a file size, etc.

Figure 5:
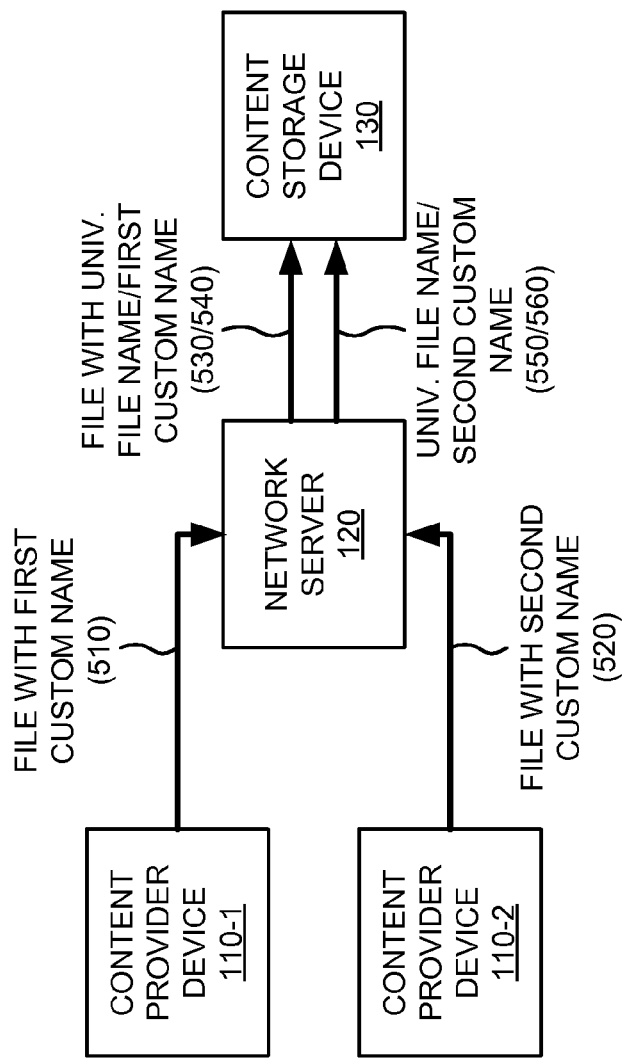
FIGS. 5 and 6 are diagrams of example interactions among components of an example portion of the network depicted in FIG. 1.

FIG. 5 illustrates a diagram of example interactions among components of an example portion 500 of network 100. As illustrated, example network portion 500 may include content provider devices 110-1 and 110-2, network server 120, and content storage device 130. Content provider devices 110, network server 120, and content storage device 130 may include the features described above in connection with, for example, FIGS. 1-4.

Users of content provider devices 110-1 and 110-2 may desire to upload a particular file to be made available through a content distribution network. As shown in FIG. 5, content provider device 110-1 may send a file with a first custom file name 510 to network server 120. Similarly, content provider device 110-2 may send a copy of the same file with a second custom file name 520 to network server 120. As described above in connection with FIG. 3, network server 120 may receive the file with first custom file name 510, extract a digital fingerprint of the file, and generate a universal file name 530 based on the digital fingerprint. Network server 120 may forward the file with universal file name 530 and a first custom name 540 (e.g., as included in the file with first custom file name 510) to content storage device 130. In one implementation, the file with universal file name 530 and first custom name 540 may be associated using data structure 400. In another implementation, network server 120 may generate information for a user interface element (e.g., for eventual presentation to a user of user device 150) that includes a visual rendering of the custom file name and a hyperlink to the universal file name.

At a later point in time, network server 120 may receive the file with second custom file name 520. Network server 120 may extract a digital fingerprint of the file with second custom file name 520, and generate a universal file name 550 based on the digital fingerprint. Since the file with second custom file name 520 is identical to the file with first custom file name 510, the two files can have an identical universal file name (e.g., universal file name 530 may be the same as universal file name 550). Network server 120 may identify as a duplicate universal file name 550 for the file with second custom file name 520. Thus, the file with second custom file name 520 may be discarded. Network server 120 may forward universal file name 550 (e.g., without the associated file) and a second custom name 560 (e.g., also without the associated file) to content storage device 130. In one implementation, universal file name 550 and second custom name 560 may be provide to content storage device in the form of a file name index, such as data structure 400. Universal file name 550 and second custom name 560 may be matched to the associated file using, for example, data structure 400.

Although FIG. 5 shows example components of network portion 500, in other implementations, network portion 500 may contain fewer components, different components, differently arranged components, or additional components than depicted in FIG. 5. Alternatively, or additionally, one or more components of network portion 500 may perform one or more other tasks described as being performed by one or more other components of network portion 500. For example, in another implementation, content provider devices 110 may extract a digital fingerprint of a file, generate a universal file name based on the digital fingerprint, and provide the universal file name to network server 120 along with the first/second custom name.

Figure 6:
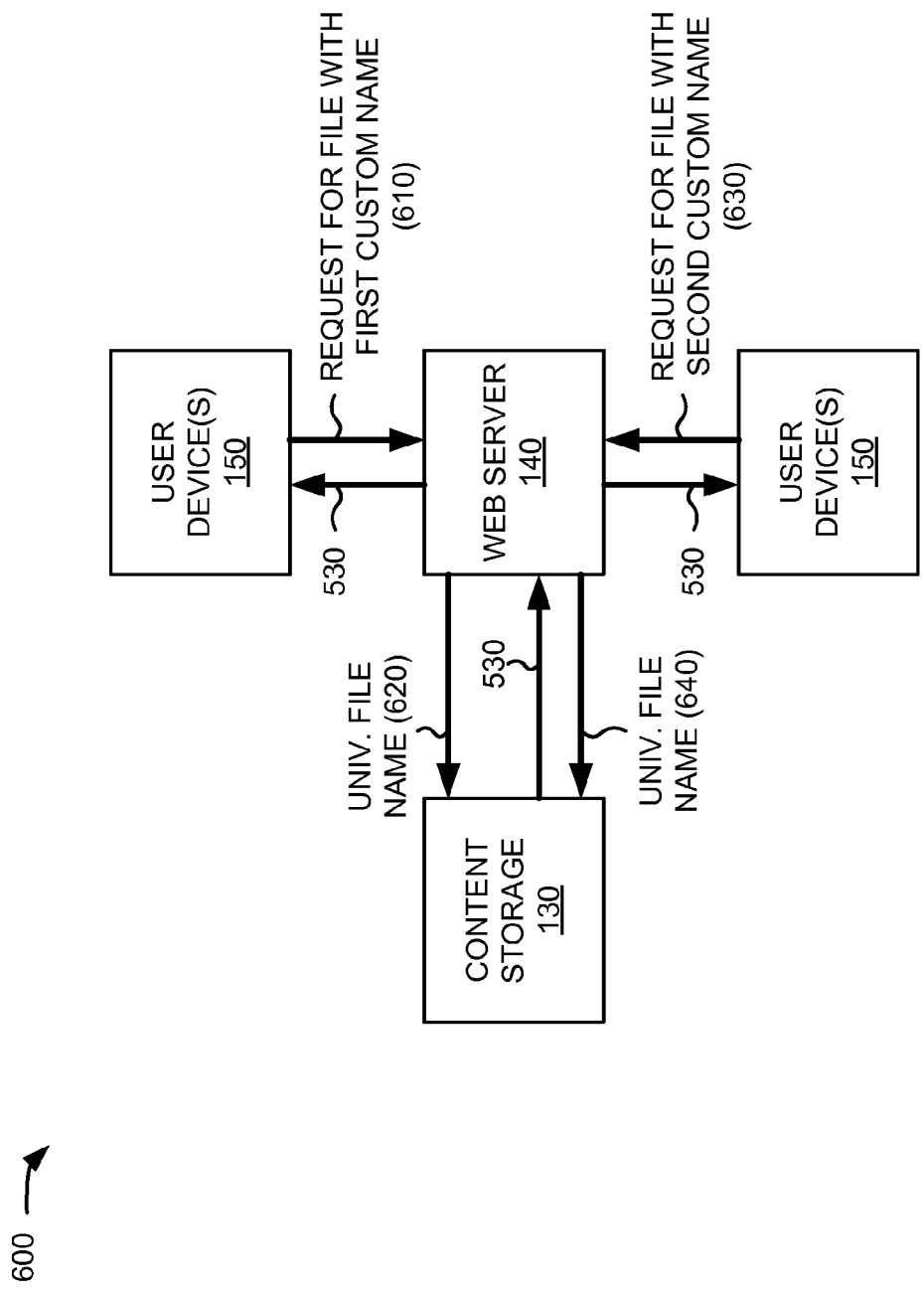

FIG. 6 illustrates a diagram of example interactions among components of another example portion 600 of network 100. As illustrated, example network portion 600 may include content storage device 130, web server 140, and two user devices 150. Content storage device 130, web server 140, and user devices 150 may include the features described above in connection with, for example, FIGS. 1-5.

As described above in connection with FIG. 5, content storage device 130 may store a file associated with universal file name 530. Content storage device 130 may also store an index, metadata, and/or other information to associate the universal file name with the first custom file name (e.g., from content provider device 110-1) and the second custom file name (e.g., from content provider device 110-2). As shown in FIG. 6, a user (e.g., a user of one of user devices 150) may desire to retrieve (e.g., download) a file with a first custom file name (e.g., file with first custom file name 510). The user may select a file based on the custom file names from provider devices (e.g., content provider device 110) that are propagated through a content delivery network. In one implementation, the file names may be propagated using a file name index, such as data structure 400. The user's selection of the file with first custom file name 510 may cause one of user devices 150 to send a request 610 for the file with first custom file name 510.

Web server 140 may receive request 610 for the file with first custom file name 510 and, in response, submit a command to retrieve the file associated with a corresponding universal file name 620. In one implementation, universal file name 620 may be included with request 610 for the file with first custom file name 510 (e.g., as a hyperlink). In another implementation, web server 140 may cross-reference first custom file name 510 with universal file name 620 using the file name index. Based on universal file name 620, web server 140 may retrieve, from content storage device 130, the file with universal file name 530 and provide the file with universal file name 530 to the user device 150 that originated the request 610.

Similarly, web server 140 may receive a request 630 for the file associated with second custom file name 520 and, in response, submit a command to retrieve the file associated with a corresponding universal file name 640. In one implementation, universal file name 640 may be included with request 630 for the file with second custom file name 520 (e.g., as a hyperlink). In another implementation, web server 140 may cross-reference second custom file name 520 with universal file name 640 using the file name index. Based on universal file name 640, web server 140 may retrieve, from content storage device 130, the file with universal file name 530 and provide the file with universal file name 530 to the user device 150 that originated the request 630.

Although FIG. 6 shows example components of network portion 600, in other implementations, network portion 600 may contain fewer components, different components, differently arranged components, or additional components than depicted in FIG. 6. In still other implementations, one or more components of network portion 600 may perform one or more other tasks described as being performed by one or more other components of network portion 600.

Figure 7:
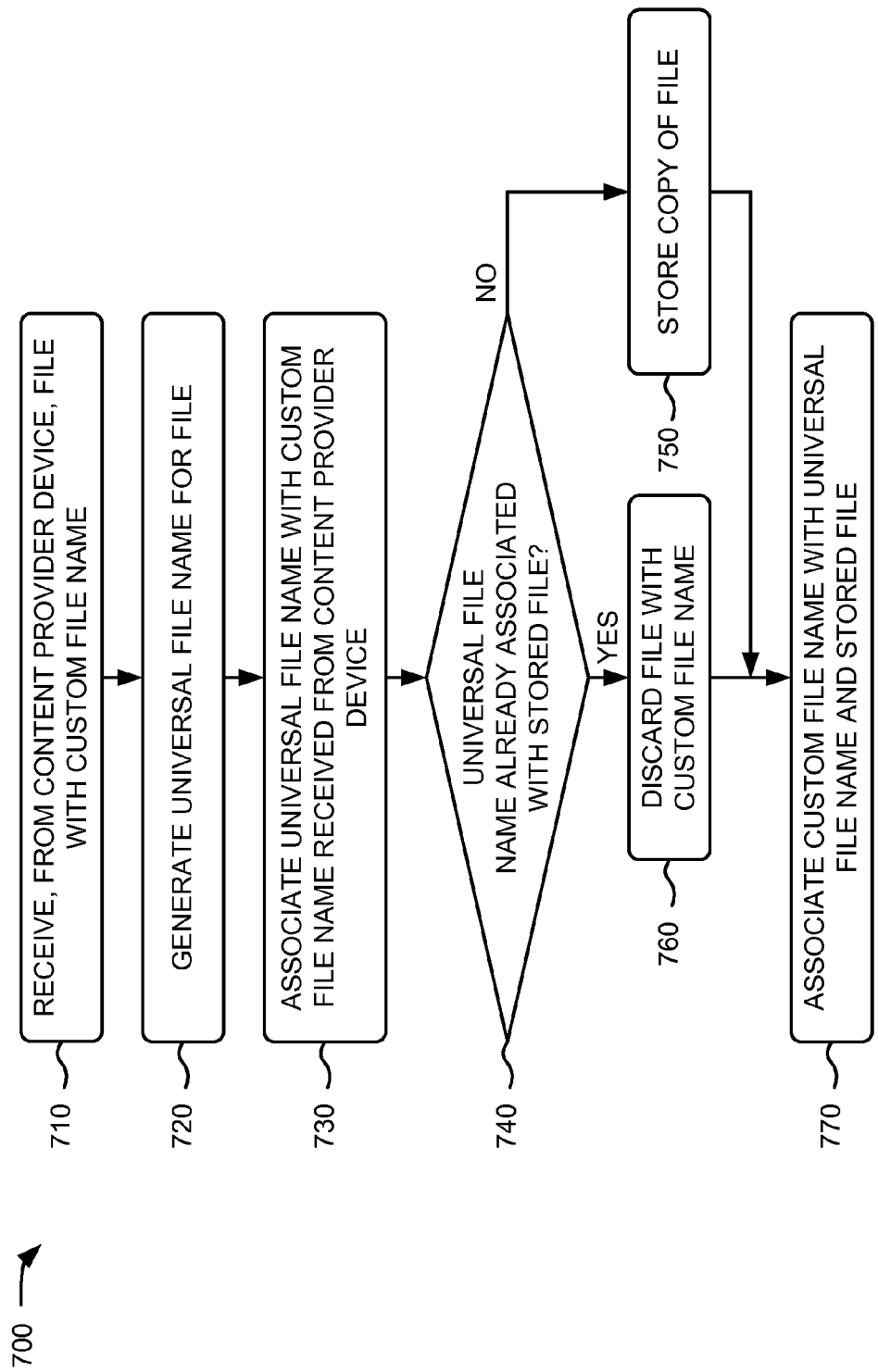
FIGS. 7 and 8 are flow charts of an example process for providing universal file names for uploaded content according to implementations described herein.
Figure 8:
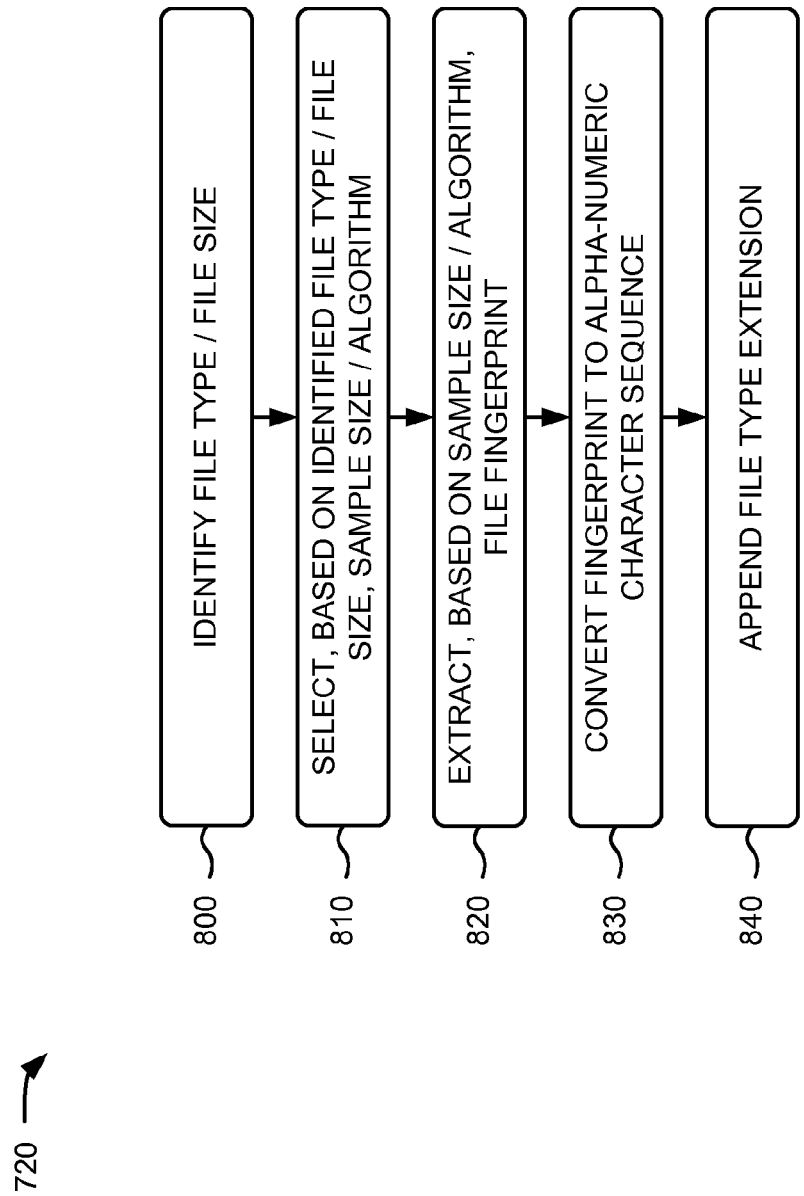

FIGS. 7 and 8 are flow charts of an example process 700 for providing universal file names for uploaded content according to implementations described herein. In one implementation, process 700 may be performed by network server 120. In another implementation, some or all of process 700 may be performed by another device or group of devices, including or excluding network server 120.

As shown in FIG. 7, process 700 may include receiving, from a content provider device, a file with a custom file name (block 710), generating a universal file name for the file (block 720), and associating the universal file name with the custom file name received from the content provider device (block 730). For example, in implementations described above in connection with FIG. 5, content provider device 110-1 may send the file with first custom file name 510 to network server 120. Similarly, content provider device 110-2 may send a copy of the same file with second custom file name 520 to network server 120. Network server 120 may receive the file with first custom file name 510, extract a digital fingerprint of the file, and generate a universal file name based on the digital fingerprint. At a later point in time, network server 120 may receive a file with second custom file name 520. Network server 120 may extract a digital fingerprint of the file with second custom file name 520, and generate a universal file name based on the digital fingerprint. Since the file with second custom file name 520 is identical to the file with first custom file name 510, the two files can have an identical universal file name. Network server 120 may forward the file with universal file name 530 and first custom name 540 (e.g., as included in the file with first custom file name 510) to content storage device 130. In one implementation, the file with universal file name 530 and first custom name 540 may be associated using data structure 400.

As further shown in FIG. 7, process 700 may include determining if the universal file name is already associated with a file (block 740). If the universal file name is not associated with a file (block 740-NO), process 700 may include storing a copy of the file (block 750) and associating the custom file name and the universal file name with the stored file (block 770). If the universal file name is associated with a file (block 740-YES), process 700 include discarding the file with the custom file name (block 760) and proceeding to block 770. For example, in implementations described above in connection with FIG. 5, network server 120 may identify as a duplicate the universal file name for the file with second custom file name 520. Thus, the file with second custom file name 520 may be discarded. Network server 120 may forward universal file name 550 (e.g., without the associated file) and second custom name 560 (e.g., also without the associated file) to content storage device 130. In one implementation, universal file name 550 and second custom name 560 may be provide to content storage device 130 in the form of a file name index, such as data structure 400. Universal file name 550 and second custom name 560 may be matched to the associated file using data structure 400.

Process block 720 may include the process blocks depicted in FIG. 8. As shown in FIG. 8, process block 720 may include identifying a file type and/or file size (block 800), and selecting, based on the file type and/or file size a sample size and/or mechanism (block 810). For example, in implementations described above in connection with FIG. 3, file identifier 310 may identify a file type and/or file size for the file uploaded from content provider device 110. File identifier 310 may, for example, identify a MIME type or file extension for a particular uploaded file. File identifier 310 may also, for example, identify the file size (e.g., a number or range of bytes) of an uploaded file. Based on the identified file type and/or file size, file identifier 310 may select a particular sample size (e.g., of N bytes from particular various places in file) and/or mechanism that is appropriate to generate a fingerprint for that file type.

Process block 720 may further include extracting, based on the sample size and/or mechanism, a file fingerprint (block 820). For example, in implementations described above in connection with FIG. 3, fingerprint extractor 320 may generate a digital fingerprint for the file uploaded from content provider device 110. Fingerprint extractor 320 may, for example, extract a fingerprint from the uploaded file that is unique to the file content (e.g., regardless of the user name assigned to the file content). In one implementation, the fingerprint may be extensive enough to distinguish files that are very similar.

Process block 720 may further include converting the fingerprint into an alpha-numeric character sequence (block 830), and appending a file type extension (block 840). For example, in implementations described above in connection with FIG. 3, file name generator 330 may convert the digital fingerprint, for the file uploaded from content provider device 110, to an alphanumeric sequence. File name generator may also append an appropriate file type extension (e.g., mp3, avi, etc.) to create a universal file name for the particular file.

FIG. 9 is a flow chart of an example process 900 for retrieving content with universal file names according to implementations described herein. In one implementation, process 900 may be performed by web server 140. In another implementation, some or all of process 900 may be performed by another device or group of devices, including or excluding web server 140.

As shown in FIG. 9, process 900 may include receiving, from a first user device, a request for a file with a first custom name (block 910), associating the first custom name with a universal file name (block 920), and retrieving and/or sending a file, associated with the universal file name, to the first user device (block 930). For example, in implementations described above in connection with FIG. 6, a user (e.g., a user of one of user devices 150) may desire to download a file with a first custom file name (e.g., file with first custom file name 510). The user's selection of the file with first custom file name 510 may cause one of user devices 150 to send request 610 for the file with first custom file name 510. Web server 140 may receive request 610 for the file with first custom file name 510 and, in response, submit a command to retrieve the file associated with corresponding universal file name 620. In one implementation, universal file name 620 may be included with request 610 for the file with first custom file name 510 (e.g., as a hyperlink). In another implementation, web server 140 may cross-reference the first custom name with universal file name 620 using the file name index. Based on universal file name 620, web server 140 may retrieve, from content storage device 130, the file with universal file name 530 and provide the file with universal file name 530 to the user device 150 that originated request 610.

Process 900 may further include receiving, from a second user device, a request for a file with a second custom name (block 940), associating the second custom name with the universal file name (block 950), and retrieving and/or sending the file, associated with the universal file name, to the second user device (block 960). For example, in implementations described above in connection with FIG. 6, web server 140 may receive request 630 for the file associated with second custom file name 520 and, in response, submit a command to retrieve the file associated with corresponding universal file name 640. In one implementation, universal file name 640 may be included with request 630 for the file with second custom file name 520 (e.g., as a hyperlink). In another implementation, web server 140 may cross-reference the second custom name with universal file name 640 using the file name index. Based on universal file name 640, web server 140 may retrieve, from content storage device 130, the file with universal file name 530 and provide the file with universal file name 530 to the user device 150 that originated request 630.

Implementations described herein may include systems and/or methods that may provide uniform file names for personal media files received from different sources. The systems and/or methods may receive, from a content provider device, a personal media file with a custom name and may generate a universal file name for the file based on a digital fingerprint extracted from the file. The systems and/or methods may associate the universal file name with the custom name and determine that the universal file name is associated with a previously-stored file, where the previously-stored file and the file with the custom name have an identical digital fingerprint. The systems and/or methods may discard the file with the custom name and may associate the custom name with the universal file name for later retrieval.

Systems and/or methods described herein may normalize various file names for the same media file and, thus, reduce the number of duplicate files stored within a CDN. By reducing the number of duplicated files the cache-hit ratio efficiency may be improved for files that are commonly downloaded.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 7-9, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
   receiving, by the computing device and from a content provider device, a file with a custom name;
   extracting, by the computing device, a digital fingerprint from a content sample of the file with the custom name;
   generating, by the computing device and based on the digital fingerprint, a universal file name for the file with the custom name;
   associating, by the computing device, the universal file name with the custom name;
   determining, by the computing device, that the universal file name is associated with a previously-stored file, where the previously-stored file is identical to the file with the custom name;
   discarding, by the computing device, the file with the custom name; and
   associating, by the computing device, the custom name with the universal file name.

2. The method of claim 1, where the associating the universal file name with the custom name includes matching the universal file name and the custom name in a file name index.

3. The method of claim 1, further comprising:
   receiving, from the content provider device, the previously-stored file with an original name, where the previously-stored file with the original name is received earlier in time than a time associated with receipt of the file with the custom name;
   generating the universal file name for the previously-stored file with the original name; and
   storing the previously-stored file with the original name.

4. The method of claim 1, where generating the universal file name for the file with the custom name includes:
   converting the digital fingerprint into an alpha-numeric character sequence, where the alpha-numeric sequence forms at least a portion of the universal file name; and
   appending a file type extension.

5. The method of claim 4, where the universal file name includes a base-36 encoding of the digital fingerprint.

6. The method of claim 1, where the file with a custom name is a personal media file and where the custom name is a name selected by a user of the content provider device.

7. The method of claim 1, where the associating the universal file name with the custom name includes generating a user interface element that includes a visual rendering of the custom file name and a hyperlink to the universal file name.

8. The method of claim 1, further comprising:
   forwarding, to a storage device, the custom name with the universal file name.

9. A device, comprising:
   a memory to store a plurality of instructions; and
   a processor to execute instructions in the memory to:
     receive, from a content provider device, a file with a custom name,
     extract a digital fingerprint from a content sample of the file;
     generate, based on the digital fingerprint, a universal file name for the file with the custom name,
     associate the universal file name with the custom name,
     determine that the universal file name is associated with a previously-stored file, where the previously-stored file and the file with the custom name have an identical digital fingerprint,
     discard the file with the custom name, and
     associate, for later retrieval of the previously-stored file, the custom name with the universal file name.

10. The device of claim 9, where the processor is further to execute instructions in the memory to:

receive, from the content provider device, the previously-stored file with an original name, where the previously-stored file with the original name is received earlier in time than a time associated with receipt of the file with the custom name, generate the universal file name for the previously-stored file with the original name, and store the previously-stored file with the original name.

11. The device of claim 9, where the universal file name includes a base-36 encoding of the digital fingerprint.

12. The device of claim 9, where, when extracting the digital fingerprint and generating the universal file name for the file with the custom name, the processor is further to execute instructions in the memory to:

select, based on a file type of the file with the custom name, a fingerprinting mechanism, extract, based on the mechanism, the digital fingerprint, from the content sample, convert the digital fingerprint into an alpha-numeric character sequence, and append, to the alpha-numeric character sequence, a file type extension.

13. The device of claim 9, where the file with a custom name is a personal media file and where the custom name is a name selected by a user of the content provider device.

14. The device of claim 9, where the processor is further to execute instructions in the memory to:

generate a user interface element that includes a visual rendering of the custom file name and a hyperlink to the universal file name.

15. The device of claim 9, where the universal file name and the custom name are associated within a file name index.

16. The device of claim 9, where the processor is further to execute instructions in the memory to:

forward, to a storage device, the custom name with the universal file name.

17. A non-transitory computer-readable medium containing instructions executable by at least one processing unit, the non-transitory computer-readable medium storing instructions to:

receive, from a content provider device, a first personal media file with a first custom name;

generate a first universal file name for the first personal media file, where the first universal file name is based on a digital fingerprint extracted from a content sample of the first personal media file;

associate the first personal media file with the first universal file name;

receive, from the content provider device, a second personal media file with a second custom name different than the first custom name;

generate a second universal file name for the second personal media file where the second universal file name is based on a digital fingerprint extracted from a content sample of the second personal media file;

determine that the first universal file name and the second universal file name are the same;

associate the second custom name with the first personal media file and the first universal file name; and discard the second personal media file.

18. The non-transitory computer-readable medium of claim 17, further comprising one or more instructions to:

generate a user interface element that includes a visual rendering of the first custom name and a hyperlink to the first universal file name; and generate a user interface element that includes a visual rendering of the second custom name and a hyperlink to the first universal file name.

* * * * *